United States Patent
Richards et al.

(10) Patent No.: US 10,198,978 B2
(45) Date of Patent: Feb. 5, 2019

(54) VIEWING OPTICS TEST SUBSYSTEM FOR HEAD MOUNTED DISPLAYS

(71) Applicant: Facebook Technologies, LLC, Menlo Park, CA (US)

(72) Inventors: Evan Mark Richards, Santa Clara, CA (US); Matthew Robert Fulghum, Palo Alto, CA (US); Samuel Redmond D'Amico, Irvine, CA (US); Shizhe Shen, San Mateo, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 275 days.

(21) Appl. No.: 14/969,012

(22) Filed: Dec. 15, 2015

(65) Prior Publication Data
US 2017/0169747 A1 Jun. 15, 2017

(51) Int. Cl.
*G06T 7/00* (2017.01)
*G09G 3/00* (2006.01)
*G02B 27/01* (2006.01)

(52) U.S. Cl.
CPC ......... *G09G 3/006* (2013.01); *G02B 27/0172* (2013.01); *G06T 7/001* (2013.01); *G09G 3/003* (2013.01)

(58) Field of Classification Search
CPC .............. G02B 27/0172; G02B 27/017; G02B 2027/014; G02B 2027/011; G06T 7/001
See application file for complete search history.

(56) References Cited

U.S. PATENT DOCUMENTS

| | | | |
|---|---|---|---|
| 7,999,851 B2* | 8/2011 | Nunez Weissman | H04N 17/002 348/187 |
| 2007/0285537 A1* | 12/2007 | Dwinell | G06T 7/001 348/263 |
| 2011/0075257 A1* | 3/2011 | Hua | G02B 27/017 359/464 |
| 2017/0172406 A1* | 6/2017 | Pamplona | A61B 3/028 |

OTHER PUBLICATIONS

Song, Weitao, et al. "Design and assessment of a wide FOV and high-resolution optical tiled head-mounted display." Applied optics 54.28 (Published Aug. 1, 2015): E15-E22.*

* cited by examiner

*Primary Examiner* — Gregory J Tryder
*Assistant Examiner* — Scott E Sonners
(74) *Attorney, Agent, or Firm* — Fenwick & West LLP

(57) ABSTRACT

An optical evaluation workstation evaluates quality metrics (e.g., optical contrast) of optical elements of a HMD. The workstation includes a test pattern, an optical element feed assembly, a light source, a camera and a control module. The light source backlights the test pattern with diffuse light. The optical element feed assembly receives an optical element of a HMD and places the optical element at a first distance from the test pattern corresponding to a distance between the optics block in the HMD and an exit pupil of the HMD. The camera images the test pattern through the optical element and the camera is positioned at a second distance from the test pattern corresponding to a distance between the exit pupil and an electronic display in the HMD. The control module generates a test report for presentation to a user based on the evaluation of the optical element.

18 Claims, 8 Drawing Sheets

A front long-side view

A back long-side view

A front short-side view

A back short-side view

VIEWING OPTICS TEST SUBSYSTEM FOR HEAD MOUNTED DISPLAYS

BACKGROUND

The disclosure relates generally to testing optical components, and specifically to systems for performing quality assurance tests on optics for head-mounted displays (HMDs).

In the context of an HMD, optical contrast (or contrast) indicates how well a HMD separates brightness and darkness in images presented to a user of the HMD. However, in this context, contrast is affected by different components of the HMD (e.g., display, optics, etc.) and it is difficult to quantitatively determine how each of the individual components of an HMD affects contrast. Additionally, while standardized test patterns (e.g., American National Standards Institute (ANSI) contrast pattern) exist that facilitate measurement of contrast, there is no standardized tests or systems to measure contrast, let alone in the context of HMDs.

SUMMARY

An optical evaluation workstation is designed to simulate the exact environment of a HMD to test the optical qualities of its viewing optics.

The optical evaluation workstation includes an optical test assembly and a control module. The optical test assembly further includes a light source, an optical element feed assembly, a test pattern assembly and a camera. The optical element feed assembly is configured to receive one or more viewing optics for testing. The test pattern assembly receives a test pattern which represents an electronic display element in a HMD and in the test pattern assembly it is backlight with diffuse light emitting from the light source. The one or more viewing optics are positioned between the test pattern assembly and the camera. The camera is placed at a distance from the test pattern that is representative of a distance between an eye of a user of the HMD and the electronic display element. The camera then takes images of the test pattern through the one or more viewing optics with and without the diffuse light applied to the test pattern.

The control module enables the optical evaluation workstation to operate a series of test procedures, executing an optical quality test to evaluate the one or more viewing optics in view of one or more quality metrics. An optical quality metric is an optical characteristic that indicates how well an optical element meets certain optical performance requirements. For example, one quality metric is optical contrast. The one or more viewing optics are first loaded into the optical element feed assembly in the optical test assembly. After the one or more viewing optics are adjusted in a proper position inside the optical element feed assembly, a background image of the test pattern is taken by the camera with the light source turned off, indicating that no light is applied to the test pattern. This image represents a dark frame, which ideally should be completely black. The light source is then turned on and provides diffuse light to the test pattern. The viewing camera then takes a series of images of the test pattern through the one or more testing optics while the test pattern is backlit with the diffuse light. A final image is generated to average noise based on the multiple images taken by the camera when light is applied. Finally, the background image is subtracted from the final image and a test report is generated for the one or more viewing optics being evaluated. The test report determines with some reference whether the one or more viewing optics meet the quality metrics. For example, the one or more viewing optics failing an optical contrast test may indicate that the one or more viewing optics are defective and should be discarded.

Some adjustment methods are also applied in the optical evaluation workstation to generate effective performances. The position of the test pattern assembly is calibrated to be vertically centered consistent with the testing viewing optics and with the camera. The physical distances between different components in the optical test assembly can also be adjusted conveniently and accurately to simulate the exact environment inside a HMD. In some embodiments, these physical distances are strictly controlled to simulate the amount of light that can go into a user's eye to correlate well to human's visual performance.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1A:
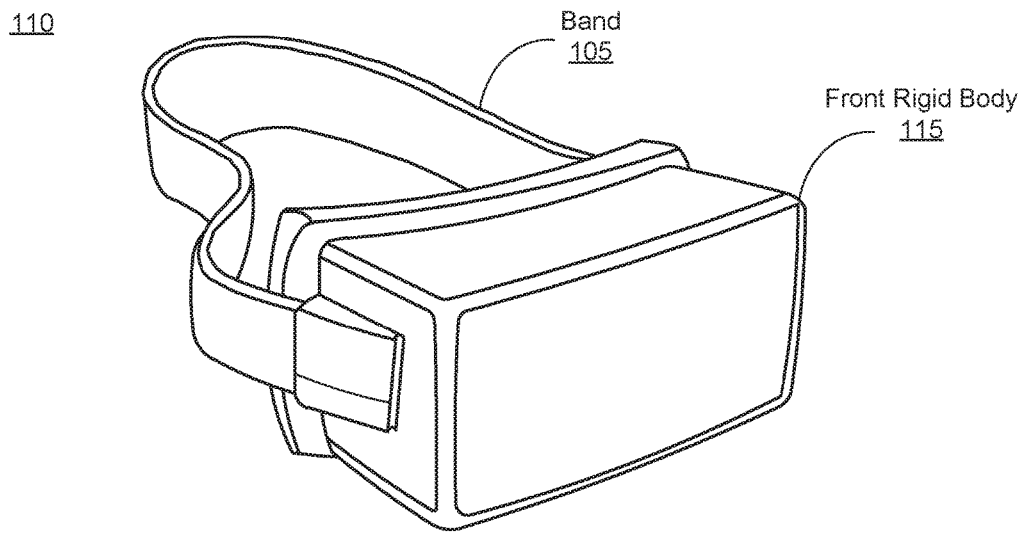
FIG. 1A is a diagram of a HMD, in accordance with one embodiment.

FIG. 1A is a diagram of a HMD 110, in accordance with one embodiment. The HMD 110 can be a Virtual reality (VR) headset that presents media to a user. Examples of media presented by the HMD include one or more images, video, audio, or some combination thereof. In some embodiments, audio is presented via an external device (e.g., speakers and/or headphones) that receives audio data based on the audio information. The HMD 110 shown in FIG. 1A includes a band 105 and a front rigid body 115. The band 105 is configured for users to wear the HMD on their head. The front rigid body 115 includes one or more optical elements which together display media to users.

Different components of a HMD 110 contribute to optical quality metrics of the optical elements inside the HMD. An optical quality metric is an optical characteristic which indicates how well an optical element meets certain optical performance requirements. For example, one quality metric is optical contrast. Optical contrast identifies the ratio of the brightness between bright portions and dark portions in an image. Other optical quality metrics are discussed below with reference to FIG. 2.

Figure 1B:
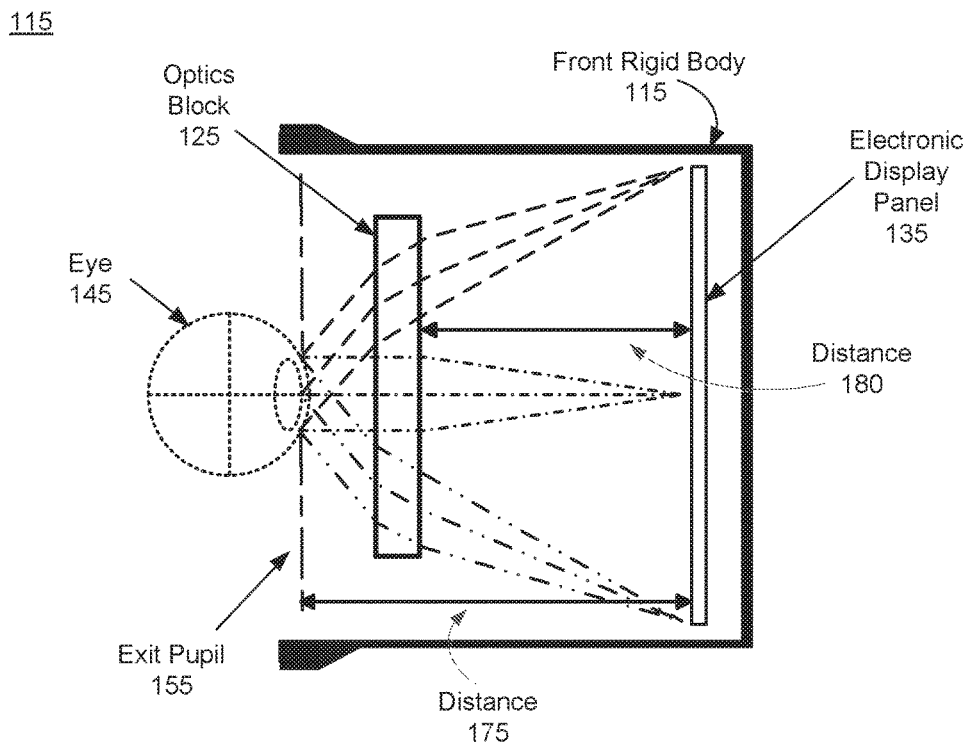
FIG. 1B is a cross section of the front rigid body of the HMD shown in FIG. 1A, in accordance with one embodiment.

FIG. 1B is a cross section of the front rigid body 115 of the HMD 110 shown in FIG. 1A. In the embodiment of FIG. 1B, the front rigid body 115 includes an optics block 125 and an electronic display panel 135 which together provide image light to an exit pupil 155. The exit pupil 155 is the location of the front rigid body 115 where a user's eye 145 is positioned when the user wears the HMD 110. For purposes of illustration, FIG. 1B shows a cross section associated with a single eye 145 and with a single optics block 125 and a single electronic display panel 135, but in alternative embodiments not shown, another set of an optics block and an electronic display panel which are separate from the optics block 125 and display panel 135 shown in FIG. 1 B, together provide image light to another eye of the user.

The electronic display panel 135 is positioned at a first distance 175 from the exit pupil 155 which is the distance between the eye of a user and the image displayed on the display panel 135. The display panel 135 displays images to the user in accordance with data received from the HMD 110. In various embodiments, the display panel 135 may comprise a single electronic display element or multiple electronic display elements (e.g., a display for each eye of a user). Examples of the display panel 135 include: a liquid crystal display (LCD), an organic light emitting diode (OLED) display, an active-matrix organic light-emitting diode display (AMOLED), some other display, or some combination thereof.

The optics block 125 is positioned at a second distance 180 from the electronic display panel 135. The optics bock 125 magnifies received image light from the electronic display panel 135 and to correct optical errors associated with the image light and the corrected image light is presented to a user of the HMD 110. In various embodiments, the optics block 125 includes one or more optical elements—also referred to as viewing optical elements. Example optical elements included in the optics block 125 include: an aperture, a Fresnel lens, a convex lens, a concave lens, a filter, or any other suitable optical element that affects image light. Moreover, the optics block 125 may include combinations of different optical elements. In some embodiments, one or more of the optical elements in the optics block 125 may have one or more coatings, such as anti-reflective coatings.

The optics block 125 may be designed to correct one or more types of optical errors. Examples of optical errors include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error.

The electronic display panel 135 and the optical elements inside the optics block 125 may both affect the quality metrics. For example, one quality metric, optical contrast may be affected by impurity of the optics inside the optics block 125. Similarly, the electronic display panel 135 may affect optical contrast by emitting a large portion of light off-axis (i.e., stray light) that bounces around in the HMD 110.

Figure 2:
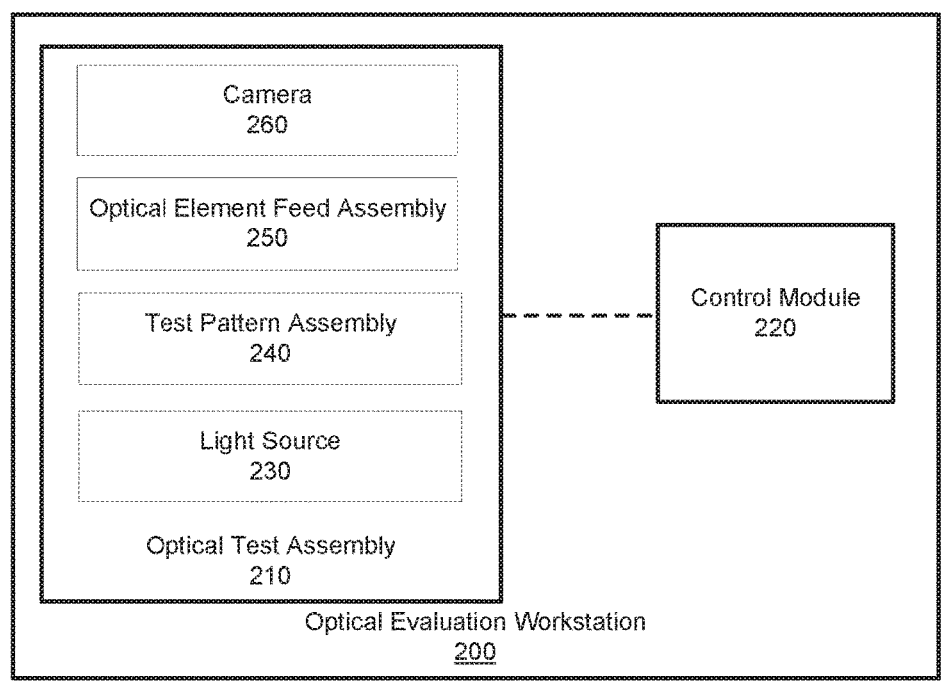
FIG. 2 is a system block diagram of an optical evaluation workstation, in accordance with one embodiment.

FIG. 2 is a system block diagram of an optical evaluation workstation 200, in accordance with one embodiment. Some embodiments of the optical evaluation workstation 200 have different components than those described here. Similarly, the functions can be distributed among the components in a different manner than is described here. The optical evaluation workstation 200 evaluates one or more optical quality metrics of an optical element in an environment designed to replicate the environment inside the HMD 110. As described above, an optical quality metric is an optical characteristic which indicates how well an optical element meets certain optical performance requirements. Example quality metrics may include spatial resolution, optical contrast, distortion, astigmatism and etc. In the context of the optical evaluation workstation 200 shown in FIG. 2, for example, optical contrast of an optical element can be tested and evaluated.

The optical evaluation workstation 200 includes an optical test assembly 210 and a control module 220. The optical test assembly 210 tests optical quality metrics of the optics block 125 (e.g., a lens) inside the HMD 110. In one embodiment, the optical test assembly 210 tests optical contrast of optical elements of the HMD 110. The optical test assembly 210 also simulates the environment inside the front rigid body 115 of the HMD 110. The optical test assembly 210 includes a light source 230, a test pattern assembly 240, an optical element feed assembly 250 and a camera 260.

The light source 230 generates diffuse light that evenly illuminates a target region. The light source 230 includes a light panel and a light diffuser. The light panel generates light that illuminates some or all of the light diffuser. The light panel may be, e.g., one or more light emitting diodes (LED), an incandescent light, a fluorescent light, some other kinds of light source, or some combination thereof. The light diffuser diffuses light such that the diffused light evenly (i.e., every part of target region receives equal brightness) illuminates the target region. The light diffuser may be, e.g., diffusing glass, diffusing plastic, some other material that diffuses light from the light panel, or some combination thereof. The light source 230 is positioned below the test pattern assembly 240 to provide light to the test pattern in the test pattern assembly 240.

The test pattern assembly 240 receives and holds a test pattern. The test pattern assembly 240 is a mounting assembly that holds a test pattern to test optical elements. The test pattern assembly 240 is positioned above the light source 230 and below the optical element feed assembly 250. The test pattern is a pattern used to test optical quality of an optics block 125. The test pattern may be, e.g., a test target for checking quality metrics such as spatial resolution, optical contrast, distortion, astigmatism, etc. For example, to test optical contrast, the test pattern is a standard contrast test target (e.g., a checkerboard pattern). The test pattern can be placed into or taken out of the test pattern assembly 240, which allows users to replace one test pattern with another different test pattern in the optical test assembly 210. In some embodiments, the test pattern assembly 240 and the light source 230 are replaced with an electrical display element that can perform the combined functions of the test pattern assembly 240 and the light source 230. The electrical display element can be, for example, the electrical display panel 135 that is used inside the HMD 110 or some other test electrical display elements that are not used inside the HMD.

An electrical display element may be an AMOLED that is capable of providing high optical contrast.

The optical element feed assembly 250 includes one or more optics holders that receive and hold optical elements. In some embodiments, there may be multiple optics holders that receive different optical elements that make up the optics block 125 (e.g., a Fresnel lens, a convex lens, a lens, a filter, etc.). After an optical element is placed in the optics holder, a user and/or the optical element feed assembly 250 places the optical element in a testing position. A test position is a specific position of the optical element being evaluated for testing optical quality metrics. As more fully described below, the optical element being evaluated is positioned vertically aligned with the camera 260 above and the test pattern below at a certain distance.

An optics holder can also have some mount components to fix the optical elements to the optics holder. The mount components hold an optical element in a specific position such that if the optical element were replaced with another optical element of the same type, other optical elements would also be held in the specific position. Accordingly, different optical elements received at different times for different optical tests are fixed in the same specific position.

The optical element feed assembly 250 positions optical elements in the optical test assembly 210 that simulate the optics block 125 inside the HMD 110. Similar to the context of the front rigid body 115 shown in FIG. 1B, the optical element feed assembly 250 positions optics for testing at the second distance 180 from the test pattern assembly 240, thereby matching the distance between the optics block 125 and the electronic display panel 135 in the HMD 110.

The camera 260 is takes images of the test pattern held by the test pattern assembly 240 in different light conditions. In some embodiments, images of the test pattern with or without light applied are captured by the camera 260. For example, the camera 260 may take images of the test pattern through the one or more optical elements being evaluated with a test pattern being illuminated by the light source 230. Similarly, the camera 260 may take a dark frame of the test pattern through the one or more optical elements being evaluated with no illumination by the light source 230. The camera 260 provides the captured images to the control module 220.

The camera 260 is positioned at the first distance 175 above the test pattern assembly 240, simulating the first distance 175 between the exit pupil 155 and the electronic display panel 135 in the HMD 110. The camera 260 is also positioned at a distance above the optical element feed assembly 250, simulating the distance between the exit pupil 155 and the optics block 125 in the HMD 110. Accordingly, the camera 260 is located where a user's eye would be located while wearing the HMD 110.

The distances from the camera 260 to the test pattern assembly 240 and to the optical element feed assembly 250 are both adjustable. In one embodiment, a user can manually adjust the distances with some adjustment components installed on the optical test assembly 210. In another embodiment, the control module 220 in the optical evaluation workstation 200 can automatically adjust the distances.

The control module 220 provides instructions to the optical evaluation workstation 200 to execute the optical tests. In some embodiments, the control module 220 receives an optical test request from a user and then instructs the optical evaluation workstation 200 to receive one or more optical elements to be tested. The control module 220 can also instruct the light source 230 to turn on and off. The control module 220 may also instruct the test pattern assembly 240 and the optical element feed assembly 250 to adjust their relative positions to other components in the optical test assembly 210. The control module can also instruct the camera 260 to take images of the test pattern held by the test pattern assembly 240 in different light conditions with the light source 230 turned on or turned off. In one embodiment, as described above, the control module 220 instructs the camera 260 to take a background image of the test pattern as a dark frame with no illumination by the light source 230. The control module 220 also instructs the camera 260 to take a series of illuminated images of the test pattern with illumination by the light source 230.

The control module 220 analyzes the images taken by the camera 260 such as the dark frame and multiple images with illumination by the light source 230. The control module 220 processes the multiple images with illumination and generates a final image to average noise like a random noise. The random noise, for example, may be a random optical noise like a noise spot that shows up on a different location in an image every time an image is taken and this noise may affect the optical test for the optical elements. This noise can be reduced or removed by averaging the multiple images with illumination. The control module 220 may also subtract the dark frame from the generated final image to further generate a test image to reduce or remove a specific noise. As described below, the specific noise, for example, may be a noise like a hot pixel that shows up on the same location of an image every time an image is taken and this noise may also affect the optical test for the optical elements. This specific noise can be reduced or removed by subtracting the dark frame of the test pattern from an illuminated image of the test pattern, in which case the specific noise is offset by the subtraction. The control module 220 then analyzes the test image to generate some evaluation results for the testing optical element.

The control module 220 evaluates the test image using one or more quality metrics. For example, if the optical element is being evaluated for optical contrast, the test image is of a standard contrast test target (i.e., a checkerboard pattern of blacks and whites). The control module 220 determines luminance values for high luminance areas on the test pattern (i.e., the white squares) and then averages the values to get an average high luminance value. The control module 220 also determines luminance values for low luminance areas on the test pattern (i.e., the dark squares) and then averages the values to get an average low luminance value. The control module 220 determines the optical contrast as the ratio of the average high luminance value to the average low luminance value. If the ratio is below a threshold value the control module 220 determines that the optical lens is degrading the optical contrast below acceptable levels. The threshold values for different types of optical evaluation systems are different. For example, an optical contrast being tested in a typical evaluation system may be acceptable if the tested ratio of contrast is higher than 50:1. Some factors may affect the test result for an optical contrast test. For example, impurities in the optical component, scratches on optical surfaces of the optical component, improper curvature, oil and/or particulates on the optical component, etc., all may negatively affect optical contrast. While evaluating optical contrast is discussed above, other quality metrics may also be evaluated by the control module 220 (e.g., spatial resolution, distortion, transmission etc.).

The control module 220 generates a test report for the testing optical element based on the evaluation results. The test report may indicate the quality metrics of the testing optical element. For example, the test report indicates optical contrast of the testing optical element, reflecting the effectiveness of the optical element to separate brightness and darkness in an image.

After one optical test is finished, the control module 220 can instruct the optical element feed assembly 250 to eject the optics holder out of the optical evaluation workstation 200 for users to remove or replace the optical elements that have been tested with a new optical element to be tested.

Figure 3A:
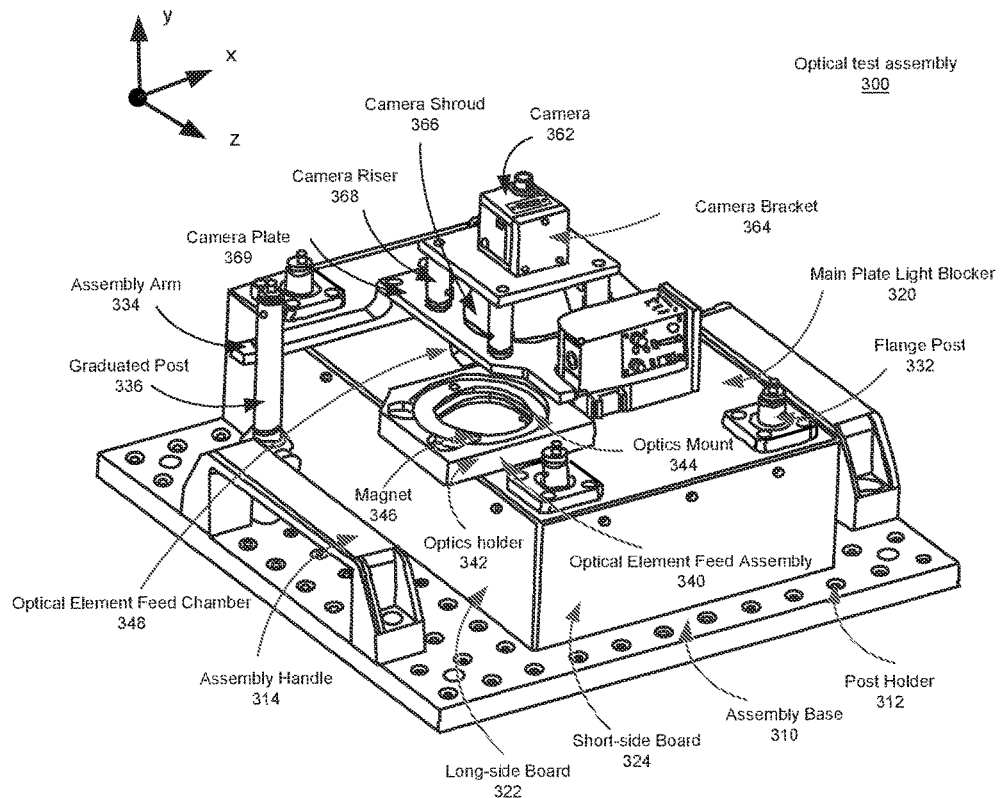
FIG. 3A is a perspective view of an optical test assembly, in accordance with one embodiment.

FIGS. 3A-G describe an optical test assembly 300, in accordance with one embodiment. The optical test assembly 300 is one embodiment of the optical test assembly 210 shown in FIG. 2 for optical test purposes. FIG. 3A shows a perspective view of the optical test assembly 300, in accordance with one embodiment. The optical test assembly 300 includes a light panel 370 (shown in FIG. 3B), a test pattern assembly 380 (shown in FIG. 3B), an optical element feed assembly 340 and a camera 362.

In the embodiment of FIG. 3A, the optical test assembly 300 is built on an assembly base 310. An enclosure is an optical box that covers and/or protects the components inside the optical test assembly 300. The enclosure comprises two long-side boards 322, two short-side boards 324, the main plate light blocker 320 and part of the assembly base 310. A side board (long or short) can be composed of any opaque materials (e.g., metal). In one embodiment, the long-side boards 322 and the short-side boards 324 are screwed together with each other and with the assembly base 310 to be mounted on the assembly base 310 and to form the protection of the enclosure. The main plate light blocker 320 positioned on top of the optical box seals the optical box to prevent light from leaking out of or into the optical box. The four flange posts 332 further tighten up and fix the optical box on the assembly base 310. In some embodiments, the flange posts 332 have tensioner springs which further allow the flange post 332 to be screwed tight with the four sides of boards and the main plate light blocker 320 to fix the optical box.

Figure 3B:
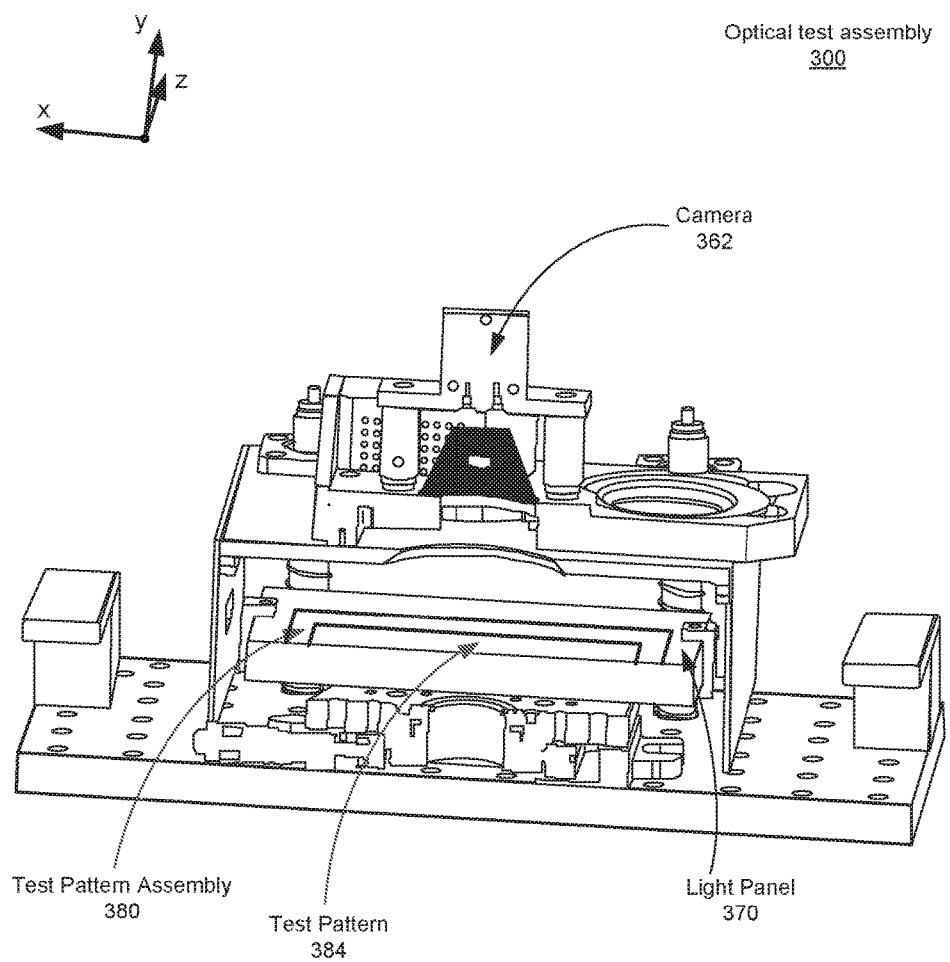
FIG. 3B is a perspective view of an X-Y and Y-Z plane of a cross section of the optical test assembly of FIG. 3A, in accordance with one embodiment.

FIG. 3B shows a perspective view of the X-Y and Y-Z plane of a cross section of the optical test assembly 300, in accordance with one embodiment. In the embodiment of FIG. 3B, the light panel 370 is part of the light source 230 that provides light to the test pattern 384 held by the test pattern assembly 380. The test pattern assembly 380 is an embodiment of the test pattern assembly 240. The light panel 370 is positioned tight beneath the test pattern 384 to backlit the test pattern. The light panel 370 may further include a light diffuser and LED arrays (not shown in FIG. 3 B) which together provide diffuse light to the test pattern 384.

The test pattern assembly 380 shown in FIG. 3B holds a test pattern 384. The test pattern 384 is adjustable to be centered inside the viewing area of the testing optical element to align the testing optical element with the camera 362. The test pattern assembly 380 is positioned at a distance below the optical element feed assembly 340 shown in FIG. 3A. The distance can be manually adjusted by a user as described below or automatically adjusted by the optical test assembly 300 with the instructions from the control module 220. In one embodiment, the test pattern 384 held by the test pattern assembly 380 is positioned separately from the light panel 370. In another embodiment, the test pattern 384 and the light panel 370 are replaced with an electrical display element to provide image light to the camera 362 through the optical element being evaluated.

Turning back to FIG. 3A, the optical element feed assembly 340 includes an optics holder 342 and an optical element feed chamber 348. The optical element feed assembly 340 is an embodiment of the optical element feed assembly 250. The optical element feed chamber 348 is positioned below the camera 362 at a distance above the assembly base 310. The optics holder 342 receives and holds the testing optical element. The optics holder 342 can swing out in an open configuration or swing in in a closed configuration. In the embodiment of FIG. 3A, the optics holder 342 is in an open configuration, in which case the testing optical element can be loaded into or removed out of the optics holder 342. In one embodiment, when the optics holder 342 receives the testing optical and an optical test request is received from a user, the optics holder 342 automatically swings into the optical element feed chamber 348 which is vertically aligned with the camera 362 above and the control module 220 instructs the optical element feed assembly 340 to fix the optical element inside the assembly 340.

The optics holder 342 further includes one or more optics mounts 344 which hold the testing optical element inside the optics holder 342. A plurality of magnets 346 are positioned on each of the optics mounts 344 to align the testing optical element in a specific position, allowing the testing optical element to be positioned parallel with the camera plate 369 as described below. The alignment also allows testing optical elements received for different tests to be placed into the same optical path replicated by the optical tests (e.g., optical contrast tests). The optics mounts 344 can be installed in or removed out when the optics holder 342 is in an open configuration. In one embodiment, the optics mounts 344 are taken out to be replaced with new optics mounts 344 for testing purposes. In another embodiment, the optics mounts 344 are taken out to be stored in other places when the optical test assembly 300 is not in use.

In the embodiment of FIG. 3A, a single optics holder 342 is shown. In alternative embodiments not shown, two a plurality of optics holders 342 can be included in the optical element feed assembly 340. For example, the plurality of optics holders 342 may be used to hold multiple optical elements that comprise an optics block 125 shown in FIG. 1B. Additionally, multiple optical holders can be used to test both optics blocks 125 in an HMD 110 (e.g., for the left eye and the right eye).

The assembly arm 334 and the graduated post 336 align the test pattern 384 and the testing optical element inside optical element feed assembly 340 in a position to approximate the corresponding environment inside the HMD 110. The graduated post 336 has a series of notches 337 shown in FIG. 3F on one side of the surface of the post 336 to allow for easy alignment with the assembly arm 334. In one embodiment, an external feeler gauge can be used to align the notch 337 on the graduated post. A vertical line 335 down the middle of the graduated post 336 shown in FIG. 3F is aligned with an arrow on the assembly arm 334 shown in FIG. 3G, which allows the height of the testing optical elements placed inside the optical element feed assembly 340 above the test pattern 384 to be measured accurately and adjusted properly by the control module 220.

A camera 362 shown in FIG. 3A is positioned above the optical elements being evaluated. The camera 362 takes images of the test pattern 384. The camera 362 is positioned at a distance from the optics holder 342 in a closed configuration to ensure the lens of the camera 362 is accurately aligned to image the test pattern 384 below. The camera 362 is also positioned at a distance from the test pattern 384 below to simulate the distance 175 between the exit pupil 155 and the electronic display panel 135 shown in FIG. 1B. In the embodiment of FIG. 3A, a camera bracket 364, a camera shroud 366, a plurality of camera risers 368 and a camera plate 369 are also shown for optical testing purposes. The camera bracket 364 holds and protects the camera 362 tight onto the bracket 364. The camera shroud 366 blocks the light received inside the camera assembly 360 from leaking out and the outside light from leaking in. The plurality of camera risers 368 mount the camera 362 enclosed by the camera bracket 364 above. The camera plate 369 is connected with the optical element feed assembly 340 below and with the assembly arm 334.

In one embodiment, the assembly base 310 includes multiple post holders 312 that allow the optical test assembly 300 to be easily installed on the assembly base 310. In one embodiment, a pair of assembly handles 314 are also mounted on the assembly base 310 for users to easily hold or move the optical test assembly setup 300.

Figure 3C:
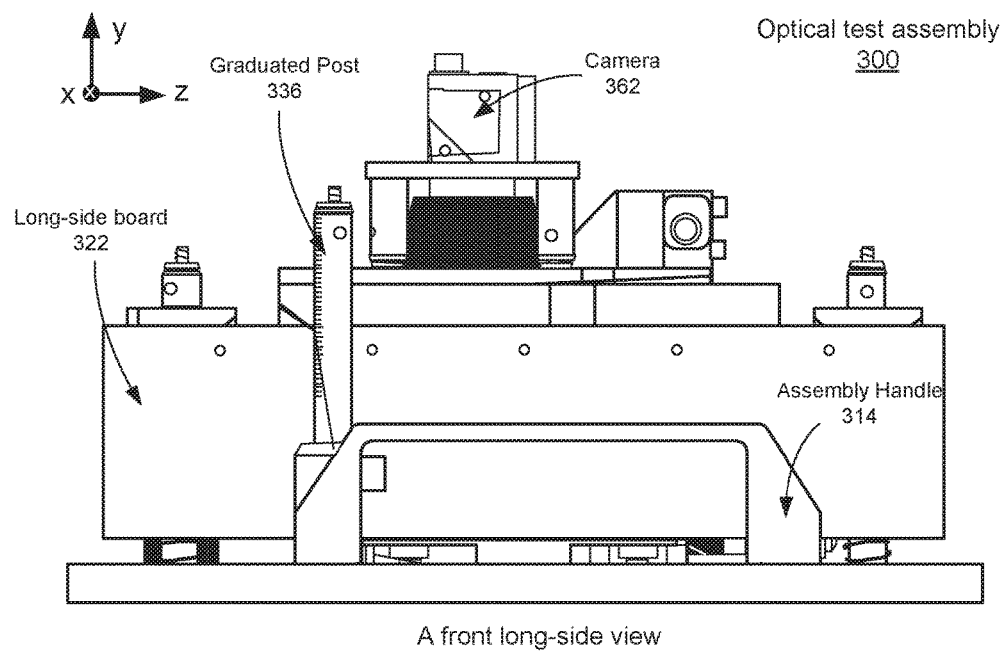
FIG. 3C is a front long-side view of the optical test assembly of FIG. 3A, in accordance with one embodiment.

FIG. 3C shows a front long-side view of the optical test assembly 300, in accordance with one embodiment. As shown in FIG. 3C, an assembly handle 314 and the graduated post 336 are positioned in front of a front long-side board 322 of the optical test assembly 300. The front long-side board 322 is the long-side board that is located on the same side with the graduated post 336 on the assembly base 310. A back long-side board 322 is the long-side board that is located in the opposite side of the graduated post 336 on the assembly base 310.

Figure 3D:
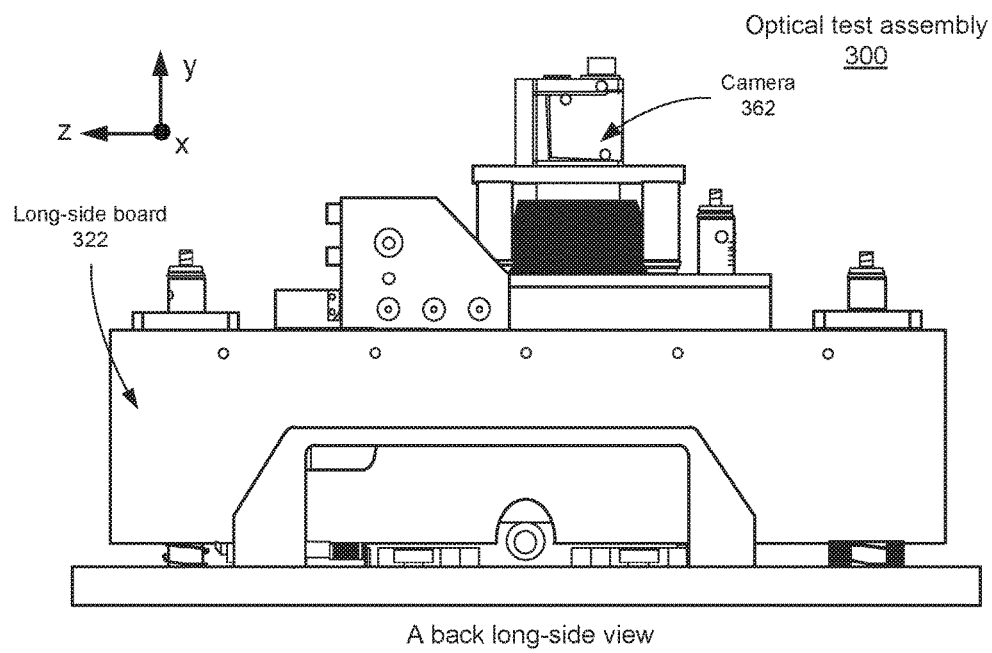
FIG. 3D is a back long-side view of the optical test assembly of FIG. 3A, in accordance with one embodiment.

FIG. 3D shows a back long-side view of the optical test assembly 300, in accordance with one embodiment. As shown in FIG. 3D, an assembly handle 314 is positioned in front of the back long-side board 332 of the optical test assembly 300.

Figure 3E:
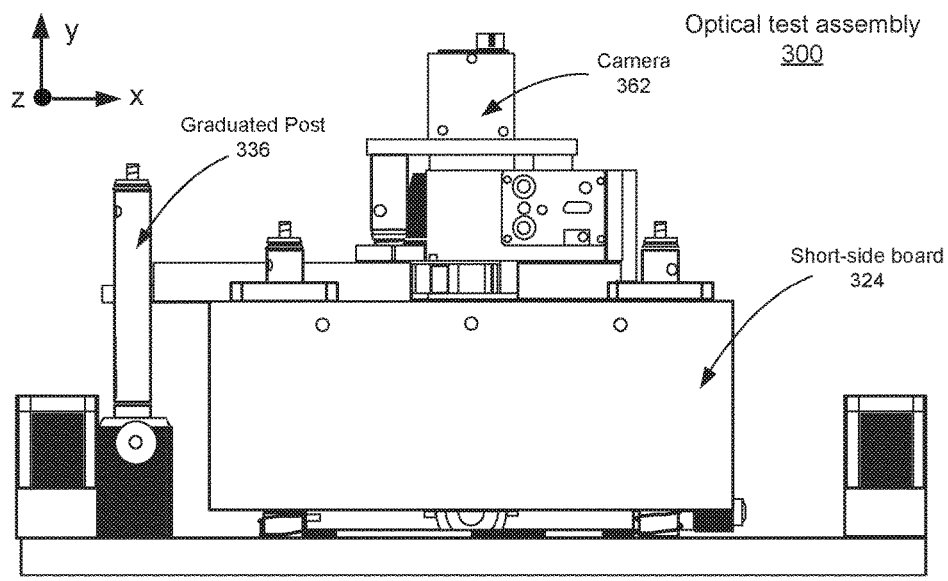
FIG. 3E is a front short-side view of the optical test assembly of FIG. 3A, in accordance with one embodiment.
Figure 3F:
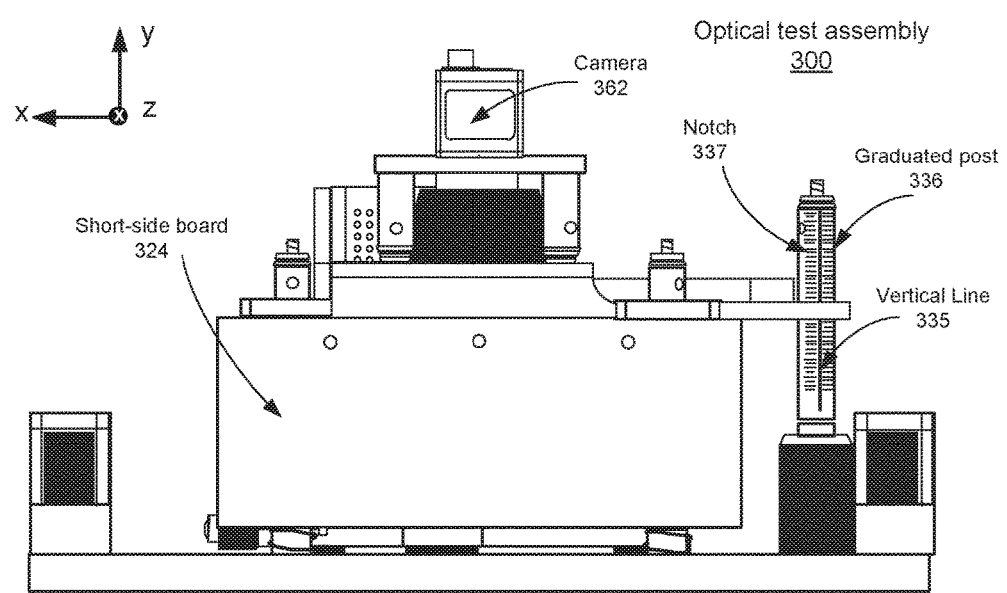
FIG. 3F is a back short-side view of the optical test assembly of FIG. 3A, in accordance with one embodiment.

FIG. 3E shows a front short-side view of the optical test assembly 300, in accordance with one embodiment. The back side of the graduated post 336 without the notches 337 and two assembly handles 314 positioned on the two sides of the optical test assembly 300 are shown in FIG. 4C. The front short-side board 324 is the short-side board that is located left to the graduated post 336 with the side of the notches 337 in the coordinate system shown in FIG. 3E. A back short-side board 324 is the short-side board that is located right to the graduated post 336 without the side of notches 337 shown in the coordinate system shown in FIG. 3F.

FIG. 3F shows a back short-side view of the optical test assembly 300, in accordance with one embodiment. The side of the graduated post 336 with the notches 337 shown and two assembly handles 314 positioned on the two sides of the optical test assembly 300 are shown in FIG. 3F.

Figure 3G:
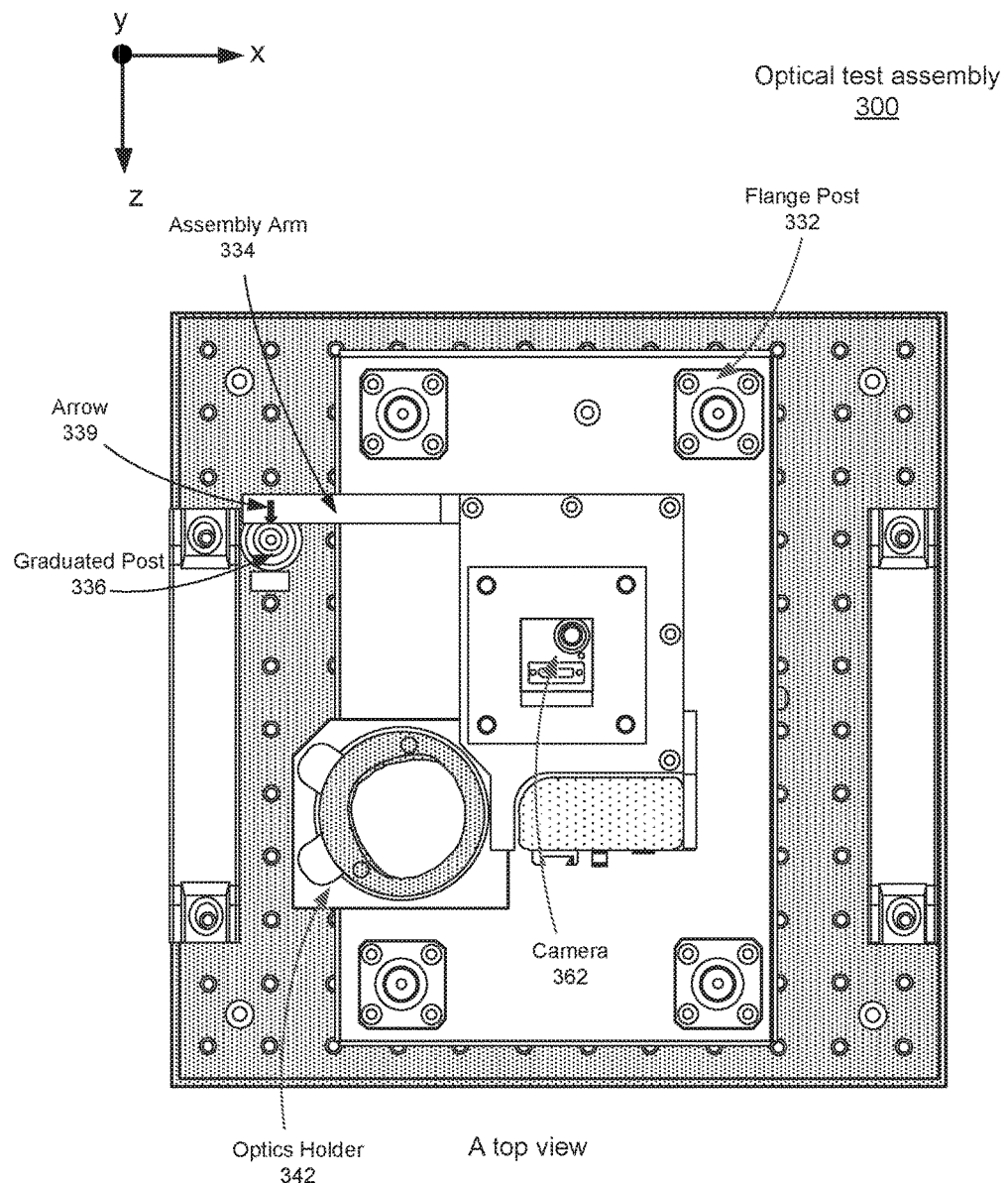
FIG. 3G is a top view of the optical test assembly of FIG. 3A, in accordance with one embodiment.

FIG. 3G shows a top view of the optical test assembly 300, in accordance with one embodiment. As shown in FIG. 3G, a plurality of flange posts 332 are positioned on the corners of the optical test assembly 300. The graduated post 336 is positioned closely next to the assembly arm 314 to adjust the height of the test pattern 384 by aligning the arrow 339 on the assembly arm 314 with the notches 337 on the graduated post 336. In the embodiment of FIG. 3G, the optics holder 342 is flipped out from the optical element feed chamber 348 in an open configuration.

Figure 4:
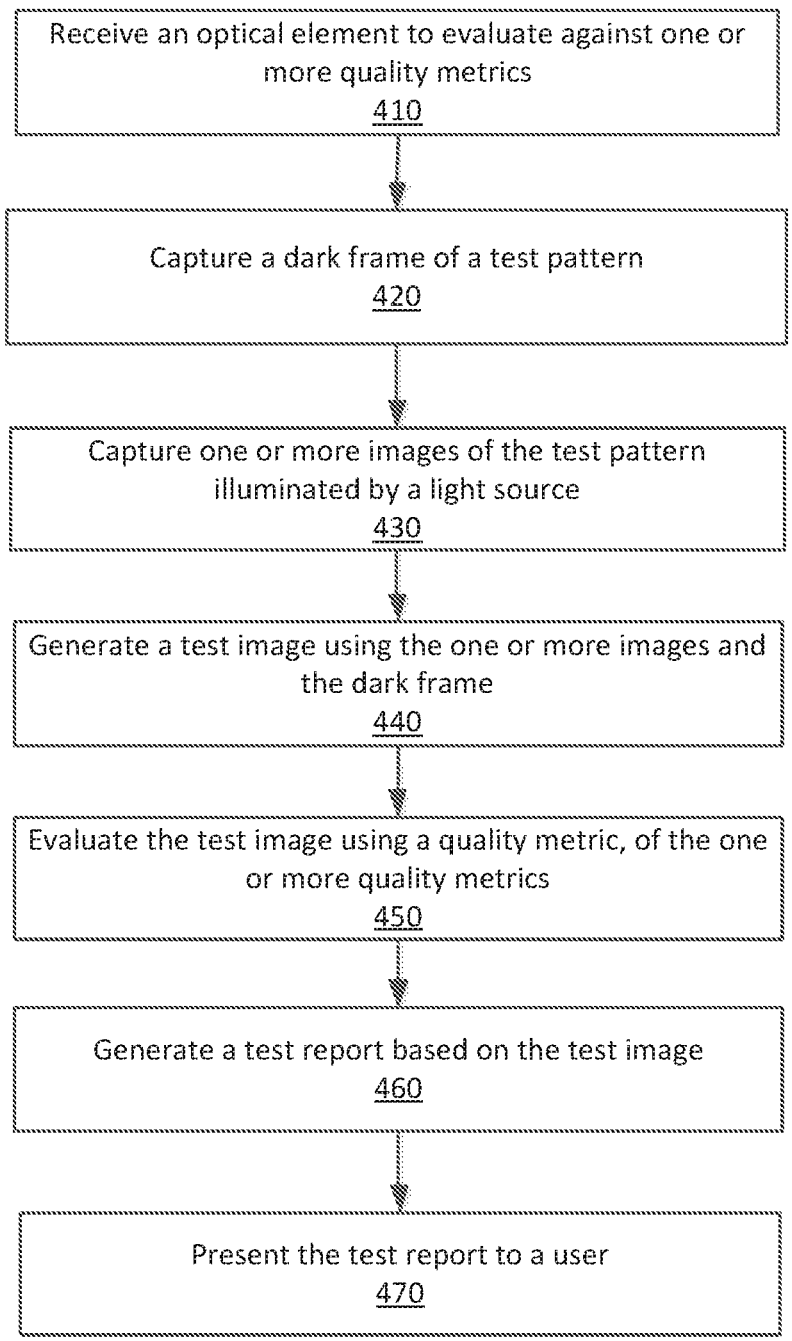
FIG. 4 is a flow chart illustrating a process of an optical test, in accordance with one embodiment.

FIG. 4 is a flow chart illustrating a process 400 for determining a quality metric of an optical element for an HMD, in accordance with one embodiment. The process of FIG. 4 may be performed by the optical evaluation workstation 200. Other entities may perform some or all of the steps of the process in other embodiments. Likewise, embodiments may include different and/or additional steps, or perform the steps in different orders.

The optical evaluation workstation 200 receives 410 an optical element to be tested and evaluated. For example, a user places an optical element in an optics mount which then places the optical element in a testing position. The testing position is a specific position of the testing optical element inside the optics holder in a closed configuration as described above, simulating the position of the optical elements inside the optics block 125 as described in FIG. 1B. In one embodiment, the optical evaluation workstation 200 detects an optical test request from a user and then ejects out the optics holder 342 to receive the optical element.

The optical evaluation workstation 200 captures 420 a dark frame of the test pattern. The dark frame is captured while the test pattern is not being illuminated by the light source 230.

The optical evaluation workstation 200 captures 430 one or more images of the test pattern while backlit by the light source 230. The optical evaluation workstation 200 generates 540 a test image from the one or more images and the dark frame. The dark frame is used to, e.g., identify hot pixels in the camera and/or stray light within the optical testing assembly 210. In embodiments, where multiple images of the illuminated test pattern is taken the images are combined to reduce noise in the test image. For example, the control module 220 may subtract out the hot pixels in each of the images to create a set of intermediate images, and then stack the intermediate images to generate the test image. As the noise from frame to frame is mostly random it generally does not increase with stacking—resulting in an increase in signal to noise ratio for the test image.

The optical evaluation workstation 200 evaluates 450 the test image using a quality metric of the one or more quality metrics. For example, if optical contrast is the quality metric used to evaluate the optical element, the optical evaluation workstation 200 determines luminance values for high luminance areas on the test pattern (i.e., the white squares) and then averages the values to get an average high luminance value. The optical evaluation workstation 200 also determines luminance values for low luminance areas on the test pattern (i.e., the dark squares) and then averages the values to get an average low luminance value. The optical evaluation workstation 200 determines the optical contrast as the ratio of the average high luminance value to the average low luminance value. The optical evaluation workstation 200 determines whether the ratio is below a threshold value. The threshold value is indicative of a minimum contrast for optical elements of an HMD. If the ratio is below the threshold value, the control module 220 determines that the optical element is degrading the optical contrast below acceptable levels (and potentially be discarded). In contrast, if the ratio is at or above the threshold value, the optical evaluation workstation 200 determines that optical element has sufficient optical contrast. As described above in FIG. 2, different types of optical evaluation systems have different threshold values for an optical contrast test. For example, a test result for an optical contrast test in a typical optical evaluation system may be acceptable if the ratio of the contrast is higher than 50:1.

The optical evaluation workstation 200 generates 460 a test report based on the test image. The test report may, e.g., indicate the optical element does/does not meet the quality metric. The optical evaluation workstation 200 presents 470 the test report to a user.

In embodiments where the test pattern assembly 240 and the light source 230 are replaced with an electrical display element (e.g., the electrical display panel 135 that is used inside the HMD 110) brightness non-uniformities in the electrical display element may interfere with determining a quality metric for an optical element. Calibration techniques may be used to mitigate effects of brightness non-uniformities in the electrical display element, and thereby maintain accurate determinations of the quality metric.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical evaluation workstation comprising:
an enclosure that encloses the workstation and is configured to block light from entering the workstation;
a contrast test target;
a light source configured to backlight the contrast test target with diffuse light, the light source comprising a light panel and a light diffuser, the light panel configured to generate light and positioned to illuminate at least a portion of the light diffuser, the light diffuser configured to substantially and evenly diffuse light received from the light source;
an optical element feed assembly configured to:
receive an optical element of a head mounted display (HMD), and
position the optical element at a first distance from the contrast test target, the first distance corresponding to a distance between an optics block in the HMD and an electronic display in the HMD;
a camera configured to capture one or more images of the contrast test target through the optical element, the camera at a second distance from the contrast test target, the second distance corresponding to a distance between an exit pupil of the HMD and the electronic display in the HMD, wherein the contrast test target is positioned between the light source and the camera such that the contrast test target is illuminated with diffuse light from the light diffuser; and
a control module configured to evaluate optical contrast of the optical element using the one or more images of the contrast test target.

2. The workstation of claim 1, wherein the control module is further configured to:
determine high luminance values for high luminance areas on the contrast test pattern;
average the high luminance values to get an average high luminance value;
determine low luminance values for low luminance areas on the contrast test pattern;
average the low luminance values to get an average low luminance value;
determine a contrast ratio of the average high luminance value to the average low luminance value; and
compare the contrast ratio to a threshold value indicative of a minimum contrast for optical elements of the HMD.

3. The workstation of claim 1, wherein the optical element feed assembly includes an optics holder which is configured to receive and hold the optical element.

4. The workstation of claim 1, wherein the control module is further configured to:
generate a test report based in part on the evaluation of the optical element; and
present the test report to a user of the optical evaluation workstation.

5. The workstation of claim 1, further comprising an adjustment mechanism to adjust the first distance.

6. The workstation of claim 1, further comprising an adjustment mechanism to adjust the second distance.

7. An optical evaluation workstation comprising:
an enclosure that encloses the workstation and is configured to block light from entering the workstation;
a test pattern for evaluating one or more quality metrics;
a light source configured to backlight the test pattern with diffuse light, the light source comprising a light panel and a light diffuser, the light panel configured to generate light and positioned to illuminate at least a portion of the light diffuser, the light diffuser configured to substantially and evenly diffuse light received from the light source;

an optical element feed assembly configured to:
receive an optical element of a head mounted display (HMD), and
position the optical element at a first distance from the test pattern, the first distance corresponding to a distance between an optics block in the HMD and an electronic display of the HMD; and a camera configured to capture one or more images of the test pattern through the optical element, the camera at a second distance from the test pattern, wherein the second distance corresponds to a distance between an exit pupil of the HMD and the electronic display in the HMD, wherein the test pattern is positioned between the light source and the camera such that the test pattern is illuminated with diffuse light from the light diffuser; and a control module configured to evaluate the optical element using a quality metric of the one or more quality metrics and the one or more images of the test pattern.

8. The workstation of claim 7, wherein the optical element feed assembly includes an optics holder which is configured to receive and hold the optical element.

9. The workstation of claim 7, wherein the control module is further configured to:
generate a test report based in part on the evaluation of the optical element; and
present the test report to a user of the optical evaluation workstation.

10. The workstation of claim 7, further comprising an adjustment mechanism to adjust the first distance.

11. The workstation of claim 7, further comprising an adjustment mechanism to adjust the second distance.

12. The workstation of claim 7, wherein the quality metric is selected from a group consisting of: optical contrast, spatial resolution, distortion, astigmatism, and some other optical characteristic.

13. A method comprising:
positioning an optical element of a head mounted display (HMD) at a first distance from a camera in an optical evaluation workstation, the workstation comprising an enclosure that is configured to block light from entering the workstation, the first distance corresponding to a distance between an optics block in the HMD and an exit pupil of the HMD;

capturing one or more images, via the camera, of a test pattern, the test pattern positioned between a light source and the camera, such that the test pattern is illuminated by the light source as viewed through the optical element, the light source comprising a light panel and a light diffuser, wherein the light panel is configured to generate light and is positioned to illuminate at least a portion of the light diffuser and the light diffuser is configured to substantially and evenly diffuse light received from the light source, the test pattern at a second distance from the camera, wherein the second distance corresponds to a distance between an exit pupil of the HMD and the electronic display in the HMD; and evaluating the optical element based in part on a quality metric and the one or more images of the test pattern.

14. The method of claim 13, further comprising:
generating a test report based in part on the evaluation of the optical element; and
presenting the test report to a user.

15. The method of claim 13, further comprising:
capturing a dark frame of the test pattern with no illumination from the light source of the test pattern as viewed through the optical element by the camera.

16. The method of claim 15, wherein evaluating the optical element based in part on the quality metric and the one or more images of the test pattern comprises:
subtracting the dark frame from the one or more images to create one or more intermediate images;
stacking the one or more intermediate images to create a test image; and
evaluating the test image with the quality metric.

17. The method of claim 13, wherein the quality metric is selected from a group consisting of: optical contrast, spatial resolution, distortion, astigmatism, and some other optical characteristic.

18. The method of claim 13, wherein the quality metric is optical contrast.

* * * * *